Aug. 25, 1931.  R. W. BURNS  1,820,116
TESTING SYSTEM
Filed Oct. 8, 1930
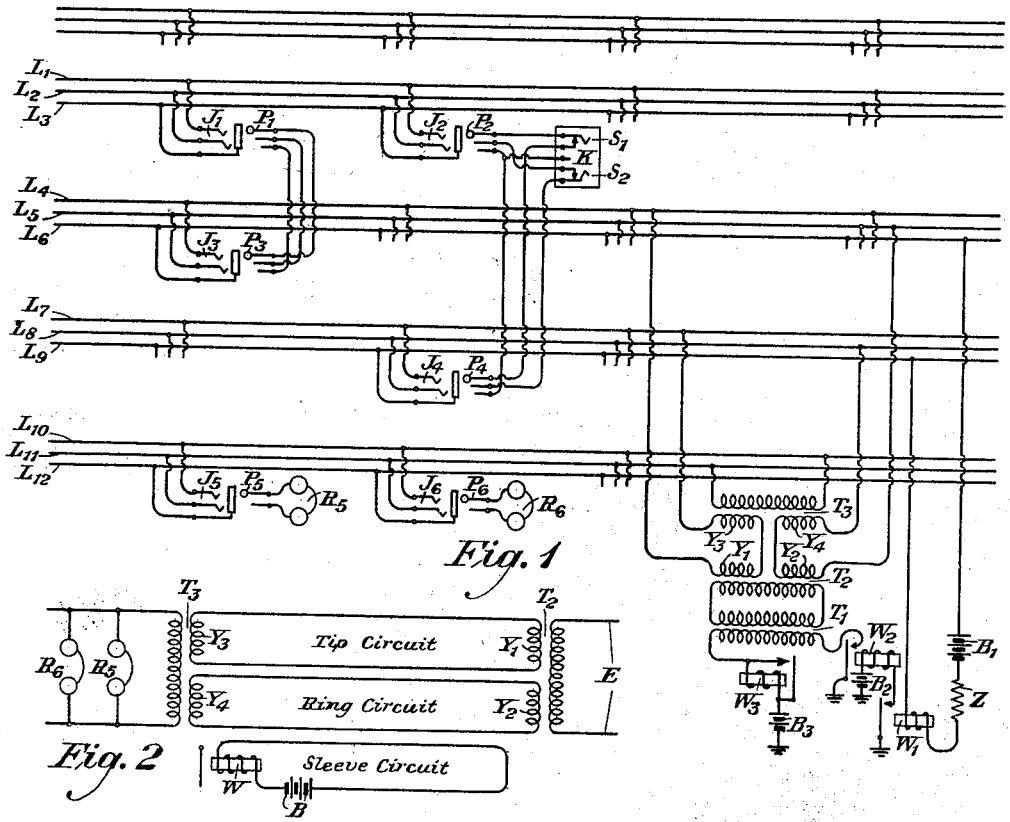
Fig. 1
Fig. 2
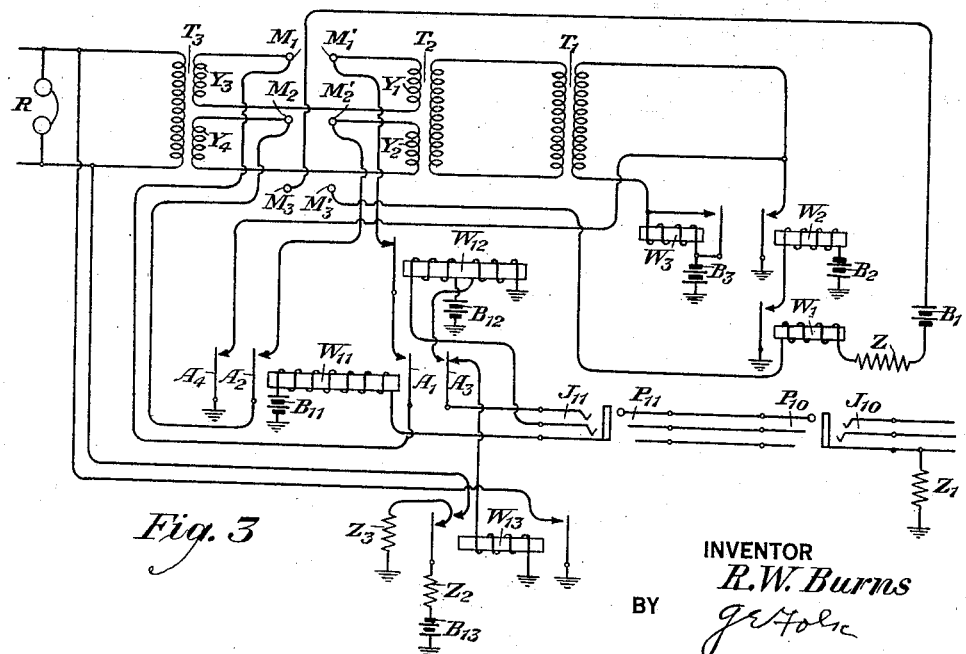
Fig. 3
INVENTOR
R. W. Burns
BY
ATTORNEY Patented Aug. 25, 1931

1,820,116

UNITED STATES PATENT OFFICE

ROY W. BURNS, OF BROOKLYN, NEW YORK, ASSIGNOR TO AMERICAN TELEPHONE AND TELEGRAPH COMPANY, A CORPORATION OF NEW YORK

TESTING SYSTEM

Application filed October 8, 1930. Serial No. 487,301.

This invention relates to testing systems. More particularly, this invention relates to arrangements for testing switchboard jacks.

This invention provides arrangements for testing switchboard jacks. The testing arrangements contemplate the use of a number of gauges in the form of plugs, specially designed and specially built, the elements of which are arranged to make electrical contact with the various jack elements in the same manner as the ordinary switchboard plugs. The plugs used for testing purposes are so designed that if the various jacks make satisfactory contact with them, the jacks will function satisfactorily when engaged with the ordinary switchboard plugs used in the telephone service. The arrangements hereinafter described provide means for producing and transmitting a distinctive signal to one or more maintenance men when any one of the various jacks fail to make satisfactory electrical contact with any one of the testing plugs.

The features of this invention represent great improvements over the jack testing arrangements of the prior art. The means heretofore employed for giving the maintenance man or men an indication of the failure of any one of a plurality of jacks to make satisfactory contact with the elements of a corresponding testing plug, involved the application of tone, i. e. alternating current or its equivalent, to the associated line or trunk circuit or the employment of an electrical condition simulating that of the circuit. Before testing any jack, it was necessary for the maintenance man to determine whether the associated circuit was in use and it was further necessary to remove the circuit from service when the test was being made. These difficulties are obviated in the practice of this invention.

While this invention will be pointed out with particularity in the appended claims, the invention itself, both as to its objects and features, will be better understood from the detailed description hereinafter following when read in connection with the accompanying drawings in which Figure 1 represents an arrangement for determining whether the contacts of a plurality of jacks properly engage the contacts of the plurality of test plugs; Fig. 2 schematically represents the fundamental elements of the invention; and Fig. 3 discloses an arrangement for determining whether or not the tip and ring contacts of any one of the plurality of jacks are short-circuited.

The arrangement shown in Fig. 1 is one in which busy circuits as well as circuits not in use may be tested without taking any circuit out of service if it is idle or without interfering with service if the circuit is busy. This arrangement obviously has distinct advantages over those known in the art especially because the jacks may be tested at any time regardless of whether or not the associated circuits are in use and it is unnecessary for the maintenance man or men to perform tests to determine whether any circuit is busy.

Referring to Fig. 1 of the drawings, the reference characters $L_1$, $L_2$, and $L_3$ represent three conductors forming one of a plurality of groups of conductors wired across a telephone switchboard. Conductors $L_1$ and $L_2$ extend well beyond the local exchange and may, for instance, terminate in a subscriber's line. Conductor $L_3$ is merely considered a sleeve conductor and may be used only for signaling between various parts of the local office. Conductors $L_4$, $L_5$ and $L_6$, conductors $L_7$, $L_8$ and $L_9$ and conductors $L_{10}$, $L_{11}$ and $L_{12}$ form three other groups which are similarly wired about the telephone switchboard, all of which, however, are local to the exchange and are used merely for testing purposes.

Two jacks designated $J_1$ and $J_2$, as well as numerous others, are connected to the conductors $L_1$, $L_2$ and $L_3$. These jacks are thus ordinarily plugged by the telephone operator in connecting a party's circuit terminating conductors $L_1$ and $L_2$ with some other circuit. These jacks may be located at adjoining sections of the switchboard, one or more of which may be placed at each section of the board, all being wired, however, in parallel relationship, as shown.

Jack $J_3$, as well as a number of other jacks of similar construction, may be connected to the testing conductors $L_4$, $L_5$ and $L_6$. Jack $J_4$ represents one of a number of jacks similarly connected to testing conductors $L_7$, $L_8$ and $L_9$. Jacks $J_5$ and $J_6$, among others, are connected in parallel relationship to the testing conductors $L_{10}$, $L_{11}$ and $L_{12}$.

Plugs $P_1$ and $P_2$ which are specially designed for testing purposes may be caused to engage the jacks $J_1$ and $J_2$, respectively, and plug $P_3$ which may be of ordinary design may be caused to engage jack $J_3$. The tip, ring and sleeve sides of plugs $P_1$ and $P_3$ are connected in parallel relationship. The plugs $P_4$, $P_5$ and $P_6$ may be caused to engage jacks $J_4$, $J_5$ and $J_6$, respectively. Plugs $P_5$ and $P_6$ may be connected to telephone head sets or receivers $R_5$ and $R_6$, respectively.

A key is designated K and this key includes two independently operable switches $S_1$ and $S_2$. The tip side of plug $P_2$ is connected to the movable side of switch $S_1$. The tip side of plug $P_4$ is connected to the fixed contact of switch $S_1$. The ring side of plug $P_4$ is connected to the movable side of switch $S_2$. The ring side of plug $P_2$ is connected to the fixed contact of switch $S_2$. The sleeve sides of plugs $P_2$ and $P_4$ are connected to each other.

The winding of a relay $W_1$ is connected in series with a resistance Z and a battery $B_1$ which may be composed of a plurality of dry cells, the series circuit extending between conductors $L_6$ and $L_9$. The armature of relay $W_1$ is grounded and its contact is connected in series with the winding of a relay $W_2$ and a battery $B_2$ and ground. The armature of the relay $W_2$ is also grounded and its contact is connected to one of the terminals of the primary winding of a transformer $T_1$. The other terminal of this primary winding is connected to the ground through a circuit which includes the winding of a relay $W_3$ and a battery $B_3$. The armature of the relay $W_3$ and its contact shunt the winding of this relay. The secondary winding of the transformer $T_1$ is connected to the primary winding of a transformer $T_2$. The latter transformer includes two secondary windings designated $Y_1$ and $Y_2$. $Y_1$ is connected in series with one of the primary windings $Y_3$ of a transformer $T_3$, these series windings, however, extending to conductors $L_4$ and $L_7$. Winding $Y_2$ is connected in series with the other primary winding $Y_4$ of transformer $T_3$ and these series windings are connected to the conductors $L_5$ and $L_8$. The secondary winding of transformer $T_3$ is connected to the conductors $L_{10}$ and $L_{11}$.

In operating this arrangement, the plugs $P_1$, $P_2$, $P_3$, $P_4$, $P_5$ and $P_6$ are caused to engage the jacks $J_1$, $J_2$, $J_3$, $J_4$, $J_5$ and $J_6$, respectively. Relay $W_1$ will operate and it will remain operated while these plugs and jacks are so engaged, current flowing from battery $B_1$ through resistance Z, the winding of relay $W_1$, conductor $L_9$, the sleeve contacts of jack $J_4$ and the plug $P_4$, the sleeve contacts of plug $P_2$ and jack $J_2$, conductor $L_3$, the sleeve contacts of jack $J_1$ and plug $P_1$, the sleeve contacts of plug $P_3$ and jack $J_3$ and conductor $L_6$. Thereafter relay $W_2$ will operate and remain operated as long as relay $W_1$ is operated, current flowing from battery $B_2$ through the winding of relay $W_2$, the armature and contact of relay $W_1$ and ground. Upon the closure of the contact of relay $W_2$ by its armature, relay $W_3$ will operate, current flowing from battery $B_3$ through the winding of relay $W_3$, the primary winding of the transformer $T_1$, the armature and contact of relay $W_2$ and ground. Upon the closure of the contact of relay $W_3$ by its armature, the winding of relay $W_3$ will become short-circuited and, therefore, relay $W_3$ will release. Thereafter, current will flow through the winding of relay $W_3$ over the circuit just traced, causing this relay to operate, and shortly thereafter this relay again will be released. Thus, it will be apparent that current flowing through the winding of relay $W_3$ will be regularly interrupted, thereby causing a pulsating direct current to flow through the primary winding of transformer $T_1$.

The presence of a pulsating current in the primary winding of transformer $T_1$ will induce alternating voltages in the secondary winding of this transformer and hence an alternating current of definite frequency will flow through the circuit including the secondary winding of transformer $T_1$ and the primary winding of transformer $T_2$. If the tip contacts of plugs $P_1$, $P_2$, $P_3$ and $P_4$ properly engage the tip contacts of the jacks $J_1$, $J_2$, $J_3$ and $J_4$, alternating current will flow through the windings $Y_1$ and $Y_3$, this circuit including, in addition to these windings, conductor $L_7$, the tip contacts of jack $J_4$ and plug $P_4$, the contact of switch $S_1$, the tip contacts of plug $P_2$ and jack $J_2$, conductor $L_1$, the tip contacts of jack $J_1$ and plug $P_1$, the tip contacts of plug $P_3$ and jack $J_3$ and conductor $L_4$. Moreover, if the ring contacts of plugs $P_1$, $P_2$, $P_3$ and $P_4$ properly engage the ring contacts of jacks $J_1$, $J_2$, $J_3$ and $J_4$, respectively, alternating current will flow through the windings $Y_2$ and $Y_4$, the completed circuit including, in addition to these windings, conductor $L_8$, the ring contacts of jack $J_4$ and plug $P_4$, the contacts of switch $S_2$, the ring contacts of plug $P_2$ and jack $J_2$, conductor $L_2$, the ring contacts of jack $J_1$ and plug $P_1$, the ring contacts of plugs $P_3$ and jack $J_3$ and conductor $L_5$.

Windings $Y_3$ and $Y_4$ will be so poled that their effects upon the secondary winding of transformer $T_3$ will be mutually opposite and, since the amplitudes of the voltages impressed by these windings on the secondary winding of transformer $T_3$ are equal, substantially no current will flow over the circuit extending from the latter winding to the tip and ring contacts of the jacks $J_5$ and $J_6$. Hence, the receivers $R_5$ and $R_6$, which are connected in parallel relationship with the tip and ring contacts of jacks $J_5$ and $J_6$, respectively, will not be energized. However, if either of the tip contacts of jacks $J_1$ or $J_2$ do not make suitable connection with the tip contacts of the plugs $P_1$ or $P_2$, current will flow through both of the receivers $R_5$ and $R_6$, creating audible signals which notify the maintenance men that there is trouble. Similarly, if either of the ring contacts of the jacks $J_1$ or $J_2$ do not make suitable connection with the ring contacts of plugs $P_1$ or $P_2$, current will also flow through both of the receivers $R_5$ and $R_6$ and similarly attract the attention of the maintenance men.

Whenever a signal is heard at the receivers $R_5$ and $R_6$, it will be necessary to determine whether the tip or ring sides of jacks $J_1$ or $J_2$ are faulty. Switch $S_1$ may be opened and if the signal at the receivers $R_5$ and $R_6$ persists, there will be positive indication that either of the tip contacts of jacks $J_1$ or $J_2$ require adjustment or repair. If, however, the audible signal is removed upon the opening of switch $S_1$, then switch $S_2$ will have to be opened and switch $S_1$ closed. If the audible signal then persists, there will be further indication that the ring sides of either jacks $J_1$ or $J_2$ are defective and require adjustment or repair.

Fig. 2 represents a schematic drawing of the circuit arrangement of the invention. Three circuits are here designated "Tip circuit", "Ring circuit" and "Sleeve circuit". These three circuits include, among other things, the tip, ring and sleeve contacts, respectively, of the contacts $J_1$, $J_2$, $J_3$ and $J_4$, which will be connected to these circuits in the manner shown in Fig. 1.

The completion of the sleeve circuit through battery B and relay W causes an alternating voltage to be applied to the circuit E. This causes alternating current to flow over both tip and ring circuits, the tip circuit including windings $Y_1$ and $Y_3$, which form parts of transformers $T_2$ and $T_3$, respectively, the ring circuit including windings $Y_2$ and $Y_4$ of these respective transformers. Inasmuch as windings $Y_3$ and $Y_4$ are oppositely poled, the currents impressed by these windings upon the secondary winding of transformer $T_3$ will have opposite phases and their effects will neutralize each other. Consequently, the receivers $R_5$ and $R_6$ will not be energized by alternating current. If, however, either the tip curcuit or the ring circuit is opened by virtue of a poor contact in one of the associated jacks, current will flow through both of these receivers $R_5$ and $R_6$ and thereby create audible signals.

The arrangement shown in Fig. 3 of the drawings may be employed to determine whether or not the tip and ring sides of any one of the various jacks which may be arranged in positions parallel to the jacks $J_1$ and $J_2$ of Fig. 1 are short-circuited. This requires a preliminary examination to determine whether or not the line connected to the tip and ring sides of the jacks under test is busy.

Transformers $T_1$, $T_2$ and $T_3$ are connected to each other in the manner shown in Fig. 1. The secondary winding of transformer $T_3$ is connected to a telephone receiver R. However, the secondary winding $Y_1$ of transformer $T_2$ and the primary winding $Y_3$ of the transformer $T_3$ are in series with each other in a circuit which includes the armature $A_1$ of the relay $W_{11}$ and its contact and the armature of the relay $W_{12}$ and its contact. The secondary winding $Y_2$ of transformer $T_2$ and the primary winding $Y_4$ of the transformer $T_3$ are in series with each other in a circuit which includes the armature $A_2$ of relay $W_{11}$ and its contact. The points designated $M_1$, $M_2$ and $M_3$ may be considered the tip, ring and sleeve contacts of, for example, the jack $J_3$ of Fig. 1. Similarly, the points designated $M'_1$, $M'_2$ and $M'_3$ may be considered the tip, ring and sleeve contacts of another jack such, for example, as $J_4$ of Fig. 1. It is to be noted also that relays $W_1$, $W_2$ and $W_3$ are interconnected in the manner shown in Fig. 1, the winding of relay $W_1$, however, being connected to the contacts $M_3$ and $M'_3$ through a resistance Z and a battery $B_1$.

The jack $J_{10}$ may be considered the jack under test. The sleeve of this jack is connected to ground through the winding of relay or a resistance $Z_1$, as shown. The tip, ring and sleeve sides of a plug $P_{10}$ which is specially designed for short-circuiting tests may engage the jack $J_{10}$ and, moreover, another plug $P_{11}$ of ordinary construction may engage a testing jack $J_{11}$.

To determine whether the line connected to the tip and ring sides of the jack $J_{10}$ is busy, the plug $P_{11}$ will be caused to engage the jack $J_{11}$ and the tip contact of plug $P_{10}$ will be moved to make temporary contact with the sleeve side of jack $J_{10}$. If the line is busy, current will flow over the circuit which includes the resistance $Z_1$, the sleeve contact of jack $J_{10}$, the tip contact of plug $P_{10}$, the tip contacts of plug $P_{11}$ and jack $J_{11}$, the armature $A_3$ of relay $W_{11}$ and its back contact, the winding of a low voltage relay $W_{13}$ and ground. The relay $W_{13}$ will operate under these conditions only if the line is busy and the battery $B_{13}$ and resistances $Z_2$ and $Z_3$ will be connected in series with each other, and, moreover, resistance $Z_3$ will shunt the receiver R. A click will be heard in the receiver. If the line is not busy, however, no such click will be heard.

After it has been definitely determined that the line is not busy, jack $J_{10}$ may be tested to determine whether or not its tip and ring contacts are short-circuited. The plug $P_{10}$ will then be caused to engage jack $J_{10}$. Relay $W_{11}$ will operate by virtue of the flow of current from battery $B_{11}$ through a circuit which includes the winding of this relay, the sleeve contacts of jack $J_{11}$ and plug $P_{11}$, the sleeve contacts of plug $P_{10}$ and jack $J_{10}$, resistance $Z_1$ and ground. Thus, the windings $Y_2$ and $Y_4$ will be connected in a complete circuit through the armature $A_2$ of relay $W_{11}$ and its contact. Moreover, the windings $Y_1$ and $Y_3$ will be connected in a complete circuit through the armature $A_1$ of relay $W_{11}$ and its contact and armature of relay $W_{12}$ and its contact.

Inasmuch as the armature $A_4$ of relay $W_{11}$ grounds one side of the primary winding of transformer $T_1$ and inasmuch as the other side of this winding is grounded through the winding of relay $W_3$ and battery $B_3$, an alternating current will be transmitted through the windings $Y_1$ and $Y_2$ to the windings $Y_3$ and $Y_4$. If the tip and ring contacts of jack $J_{10}$ are short-circuited, however, a similar current of opposite phase will flow through the windings $Y_1$ and $Y_3$ to the receiver R. These currents will neutralize each other and no current will flow through the receiver R. If, however, the tip and ring contacts of jack $J_{10}$ become short-circuited when the plug $P_{10}$ is caused to engage the jack $J_{10}$, the relay $W_{12}$ will then operate, current flowing from battery $B_{12}$ through the left-hand winding of relay $W_{12}$, the contact of jack $J_{11}$ and plug $P_{11}$, the ring contacts of plug $P_{10}$ and jack $J_{10}$, the tip contacts of jack $J_{10}$ and plug $P_{10}$, the tip contacts of plug $P_{11}$ and jack $J_{11}$, the armature $A_3$ of relay $W_{11}$ and its front contact, the right-hand winding of relay $W_{12}$ and ground. The opening of the circuit to the winding $Y_3$ at the contact associated with the armature of the relay $W_{12}$ causes current to flow through the secondary winding of transformer $T_3$ to energize the receiver R.

While this invention has been disclosed in certain particular arrangements merely for the purpose of illustration, it will be understood that the general principles of this invention may be applied to other and widely varied organizations without departing from the spirit of the invention and the scope of the appended claims.

What is claimed is:

1. A testing system including a plurality of jacks to be tested, a plurality of plugs each of which engages one of said jacks, a source of alternating current, a pair of circuits coupled to said source of alternating current, the tip sides of said jacks and said plugs being included in series with each other in one of said circuits, the ring sides of said jacks and plugs being included in series with each other in the other of said circuits, and receiving means coupled to said pair of circuits, said pair of circuits being poled so that their effects on said receiving means will be mutually opposite.

2. A testing system including a plurality of jacks to be tested, a plurality of plugs each of which engages one of said jacks, a source of alternating current, receiving means, a circuit coupling said source of alternating current with said receiving means and including the tip sides of said jacks and plugs in series relationship, another circuit coupling said source of alternating current with said receiving means and including ring sides of said jacks and plugs in series relationship, and means connected to both of said circuits to open either of them.

3. The combination of a plurality of jacks, a plurality of plugs, each jack and each plug having tip, ring and sleeve contacts, apparatus including the sleeve contacts of all of said plugs and jacks for producing pulsating currents, a first circuit coupled to said apparatus and including the tip contacts of all of said plugs and jacks for deriving alternating current of one phase, a second circuit coupled to said apparatus and including the ring contacts of all of said plugs and jacks for deriving alternating current of opposite phase, and receiving means coupled to said first and second circuits.

4. The combination of a receiver, a plurality of jacks to be tested, a plurality of test plugs, a source of alternating potential, a first circuit including one of the contacts of each of said plugs and the corresponding contact of each of said jacks and coupling said receiver with said source, and a second circuit including another of the contacts of each of said plugs and corresponding contact of each of said jacks also coupling said receiver with said source.

In testimony whereof, I have signed my name to this specification this 7th day of October 1930.

ROY W. BURNS.